Nov. 6, 1923.
M. T. LOTHROP
1,472,922
MANUFACTURE OF ROLLER BEARING CUPS AND THE LIKE
Filed Jan. 4, 1922
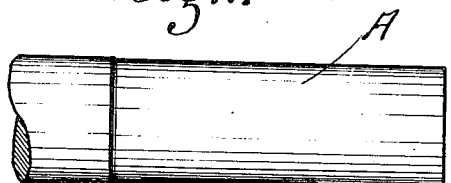
Fig. 1.
Fig. 4.
Fig. 2.
Fig. 5.
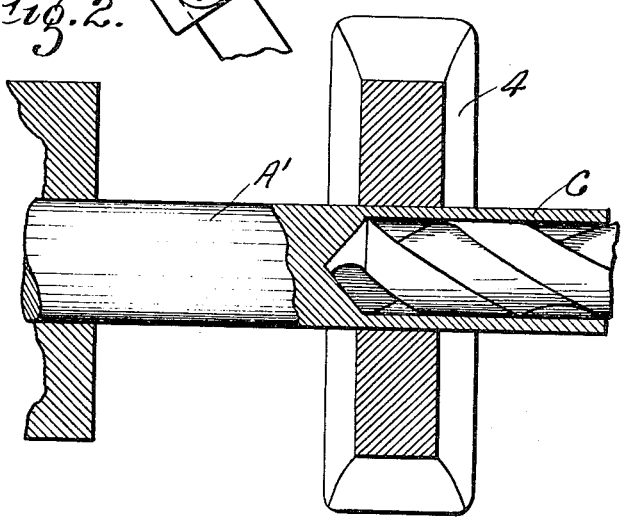
Fig. 6.
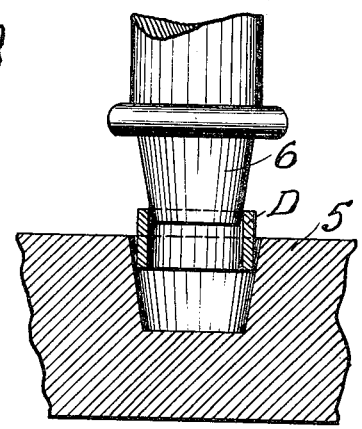
Fig. 3.
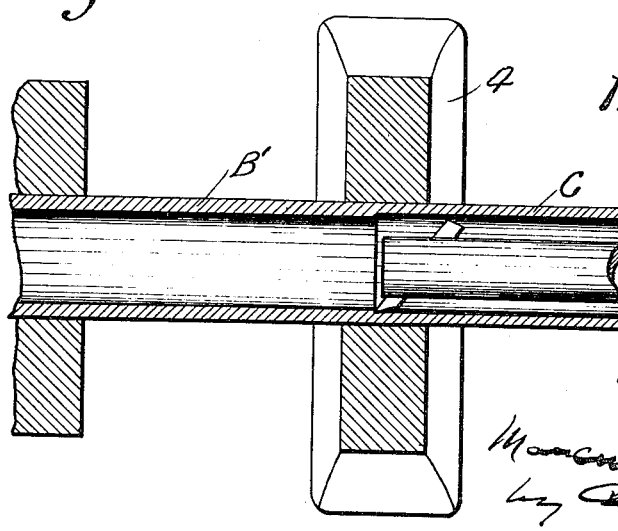
Fig. 7.
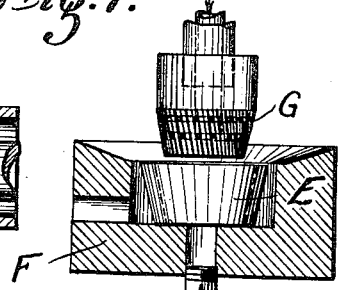
Inventor:
Marcus T. Lothrop,
by
his Attorneys.

Patented Nov. 6, 1923.

1,472,922

UNITED STATES PATENT OFFICE.

MARCUS T. LOTHROP, OF CANTON, OHIO, ASSIGNOR TO THE TIMKEN ROLLER BEARING COMPANY, OF CANTON, OHIO, A CORPORATION OF OHIO.

MANUFACTURE OF ROLLER-BEARING CUPS AND THE LIKE.

Application filed January 4, 1922. Serial No. 527,009.

*To all whom it may concern:*

Be it known that I, MARCUS T. LOTHROP, a citizen of the United States, and a resident of the city of Canton, in the county of Stark and State of Ohio, have invented a new and useful Improvement in the Manufacture of Roller-Bearing Cups and the like, of which the following is a specification.

My invention relates to the manufacture of roller bearing cups and the like and has for its principal objects to simplify the process of manufacture, to economize labor and material, and to produce a superior product with a minimum of loss. The invention consists principally in starting with a tube or bar doing the machining work thereon and then cutting off annular sections to be converted into cups; it also consists in the operations hereinafter described; and it also consists in the cup hereinafter described.

In the accompanying drawing in which the various steps of the process are diagrammatically illustrated, Fig. 1 shows the bar or tube being turned to true up its outer surface, Fig. 2 shows a bar being bored out concentric with the outer surface, Fig. 3 shows the bore of a tube being smoothed, Fig. 4 shows the location of the cuts for forming the annular slugs, Fig. 5 is a view of an annular slug, Fig. 6 shows the die shaping operation, and Fig. 7 shows the finished cup in position in the quenching apparatus.

According to the present process, the outer surface of a bar A or tube of considerable length is turned to true circularity by a suitable tool 1 and preferably polished. The tube B' or bar A' thus turned is then mounted in a boring or drilling machine and the end portion thereof is bored out accurately concentric with the outer surface thereof. Any suitable tool is used, a drill 2 being shown operating on the bar in Fig. 2, and a cutting tool 3 operating on the tube in Fig. 3. The bored portion C is cut off in the form of annular slugs or rings D of the proper mass required for the finished article. Preferably, the boring of the end of the tube extends deep enough to permit several rings or annular slugs to be cut off after each boring operation. The tube or bar is then fed forward; and again the end thereof is bored and again the bored portion is cut into annular slugs or rings, and these operations are repeated intermittently until the tube or bar is used up. During the operation of boring the centering chuck or work holder 4 cooperates with the turned outer surface of the tube or bar so as to keep the same in accurate axial alinement with the boring spindle; so that the inner cylindrical surface formed by such boring tool is accurately concentric with the cylindrical outer surface of said tube or bar.

The slugs or annular rings with accurately concentric cylindrical surfaces both on the outside and on the inside are placed in a die 5 of circular section and are upset therein by action of suitable die-plungers 6 which cause the metal of the slug or ring D to flow plastically and conform to the inner surface of the die and to the outer surface of the plunger and also to conform at its upper and lower ends respectively to the annular shoulder of the plunger and to the annular seat of the die. Ordinarily the die and the plunger will be of conical form but of different taper; but the process is also applicable when both the plunger and the die are cylindrical or one cylindrical and the other conical.

The ring E thus upset constitutes the green cup and is ordinarily in condition, without further operation, for heat treatment. Such green article is packed in a suitable carbonizing material and heated in a hardening furnace in the usual way and is then quenched. For the purpose of preventing distortion, the hot cup is removed from the hardening furnace and is immediately placed in a suitable support, such as the conical cavity of a block F in which its outer surface fits and which is located in axial alinement with a conical plug G of the size and taper desired for the finished article, and which plug is preferably fluted with a multiplicity of helical grooves which communicate with a controllable source of quenching liquid, all as fully set forth in my co-pending application for Letters Patent therefor Serial No. 442,737, filed February 5, 1921. As therein described, the plug is forced into the interior of the hot cup far enough to insure the proper sizing of the cup and its freedom from distortion during quenching.

Preferably, the green cup, even in its heated condition, is of slightly less diameter than required for the finished article, so that the forcing of the plug into such cup causes a mechanical enlargement of the bore of the heated cup and a circumferential stretching thereof. The quenching is performed so very rapidly that there is no appreciable cooling between the time at which the cup is removed from the furnace and the flooding thereof with the quenching liquid; and the grooves of the plug enable the quenching liquid to operate over substantially the whole surface with great rapidity.

While it is preferable to start with a long tube, it is feasible to start with a bar; but the operation of drilling and boring the bar unnecessarily increases the expense in comparison with the mere enlargement of the bore of a tube. In either case, however, the operation of turning the outer surface of the tube or bar throughout its length is far more economical than the practice common heretofore of limiting the turning operation to a small portion adjacent to the end of the tube or bar; and it is likewise more economical to bore the end of the tube or bar than it is to do the boring on a shallow blank. Not only does the performance of the operations on the outer and inner surfaces prior to severance from the tube or bar involve economy of work, but it also contributes to greater accuracy of product and to a saving of material and time.

As the die-formed cup is accurately shaped and sized, and as the operation of quenching insures freedom from distortion and accurate conformation to the shape and size required for the finished article, there is no need for grinding such cup. It follows therefore that neither the inner nor outer surface of said cup will have any tool marks, as no cutting or grinding tools are used on such surface subsequent to the severance of the ring from the original tube. Thus, the cup will preserve the full depth of the hardened case, and the bearing surface will be sound and free from the flaws and injuries so frequently occasioned by grinding.

While the process is described hereinabove with reference to the production of a conical cup, for which it is especially applicable and economical, it is also applicable to the manufacture of cylindrical cups and to cups of special curvature; and I do not wish to be restricted to any specific form of cup. In such cases the upsetting action flows the metal laterally against the inner wall of the die as in coining, throughout the length of the cup.

Obviously some of the advantages of my process can be obtained without following all the operations hereinbefore set forth. For instance, instead of boring a cylindrical hole in the end of the tube or bar, the inside of the end of the tube may be turned to obtain the shape desired for the cup prior to the severance of such cup from the tube or bar, in which case the upsetting process may be dispensed with and the article hardened as described. Likewise, the outer surface of the tube may be left more or less rough and may be finished in any suitable way after hardening of the bearing surface.

What I claim is:

1. The process of manufacturing cups for roller bearings and the like which consists in turning the outer surface of a tube or bar to a cylindrical form throughout its length, boring the end of such tube or bar concentric with the outer surface thereof to a depth sufficient for several slugs, severing therefrom annular slugs of the mass required for the finished cup, die-shaping such slugs, heat treating the same and quenching the same while restrained to prevent distortion.

2. The process of manufacturing cups for roller bearings and the like which comprises turning the surface of a tube or bar to a cylindrical form, substantially the full length thereof, boring the end of such tube or bar concentric with the outer surface thereof, severing the bored portion into annular slugs, heat treating the same and quenching the same while restrained to prevent distortion.

3. The process of making cups for roller bearings and the like which consists in turning the outer surface of a tube or bar, intermittently boring an end of said tube or bar concentric with its outer surface and cutting off annular slugs from said bored end, upsetting such slugs in shaping dies to form green cups, heat treating said cups to harden them and quenching the same on fluted plugs to prevent distortion.

4. The improvement in the process of making annular articles which comprises the turning of the outer surface of an elongated tube or bar substantially throughout its length, using the turned surface thereof for centering said tube or bar in a boring machine, boring of the inner surface thereof concentric with the outer surface, severing annular slugs from the bored end and upsetting said slugs in shaping dies.

5. The improvement in the manufacture of cups for roller bearings which consists in accurately turning the surface of a tube to a cylindrical form and using the cylindrical surface thereof for cooperation with the work centering elements of a boring machine, whereby the outer and inner surfaces of the end portion of said tube can be made accurately concentric prior to the severance thereof from the body of the tube.

6. A cup for roller bearings which preserves the entire mass of the ring from which it is made, said cup being made by upsetting a ring with shaping dies and hardening the bearing surface thereof by quenching the same on a spirally fluted sizing plug after suitable heat treatment.

7. A cup for roller bearings produced by the process hereinabove described wherein the cup is hardened on a ribbed sizing plug, said cup having a hardened case for its inner bearing surface, the entire case resulting from the hardening operation being preserved in the finished article and having marks of the ribs of the sizing plug on which it was quenched.

8. The process of manufacturing cups for roller bearings and the like which consists in turning the surface of an elongated tube or bar to a cylindrical form substantially throughout its length, using the turned surface thereof for centering the same in a boring machine, boring the end of such tube or bar concentric with the outer surface thereof and to a depth sufficient for several slugs, severing therefrom annular slugs each of the mass required for the finished cup, die-shaping such slugs, and heat treating the same.

9. The process of manufacturing cups for roller bearings and the like which comprises turning the surface of a tube or bar to a cylindrical form substantially the full length thereof, boring the end of such tube or bar concentric with the outer surface thereof and to a depth sufficient for several slugs, severing the bored portion into annular slugs and heat treating the same.

Signed at Canton, Ohio, this 31st day of December, 1921.

MARCUS T. LOTHROP.